June 7, 1960 L. SILVERMAN 2,939,545
GAS FILTER
Filed Feb. 26, 1958

INVENTOR.
LESLIE SILVERMAN
BY
Brown, Critchlow, Flick & Peckham
His Attorneys

United States Patent Office 2,939,545
Patented June 7, 1960

2,939,545
GAS FILTER

Leslie Silverman, Dover, Mass., assignor to Mine Safety Appliances Company, Pittsburgh, Pa., a corporation of Pennsylvania Filed Feb. 26, 1958, Ser. No. 717,596
4 Claims. (Cl. 183—110)

This invention relates to filters for streams of gas, and it is an object of the invention to provide a filter in which dust or other particulate matter (hereinafter referred to as dust) is removed from a gas stream by a combination of inertia, settling and ordinary filtering.

In accordance with this invention, an upright rectangular frame is provided in its bottom with a chamber having outlets in its back. A plurality of vertical bars are arranged in parallel rows in the frame, with the bars in each row staggered relative to those in the row behind them. Each bar has a central deflector portion extending lengthwise thereof and tapered upstream in transverse section. Each bar also has dust collecting portions extending outward from opposite sides of the downstream end of its deflector and then upstream to form transversely curved inner surfaces. The top of the frame chamber is provided with an opening directly behind each bar. Disposed at the back of these openings are transversely curved vertical strips that extend from top to bottom of the frame. Each strip is spaced from the bar in front of it and has its side portions curved forward beside that bar and meeting its edges. The curved dust collecting portions of the bars are provided with passages for some of the gas flowing through the filter, so that it can strike the baffle strips and flow down through the openings in the top of the chamber. Filtering material preferably is disposed in the chamber. The top of the frame may be provided with a similar chamber, and the front of each chamber preferably is provided with additional inlet openings.

Figure 1:
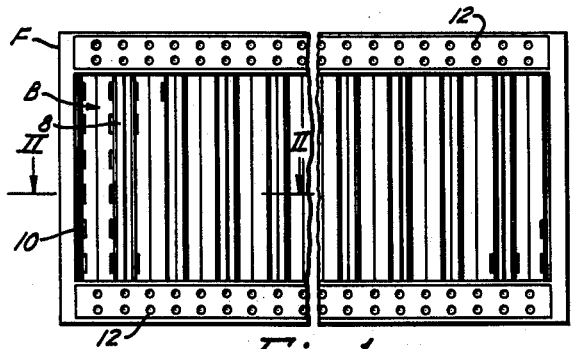
Figure 3:
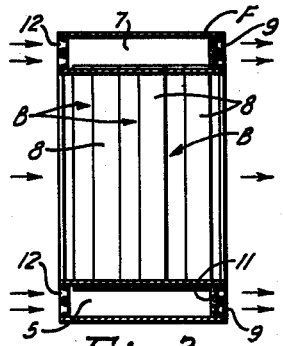
Figure 2:
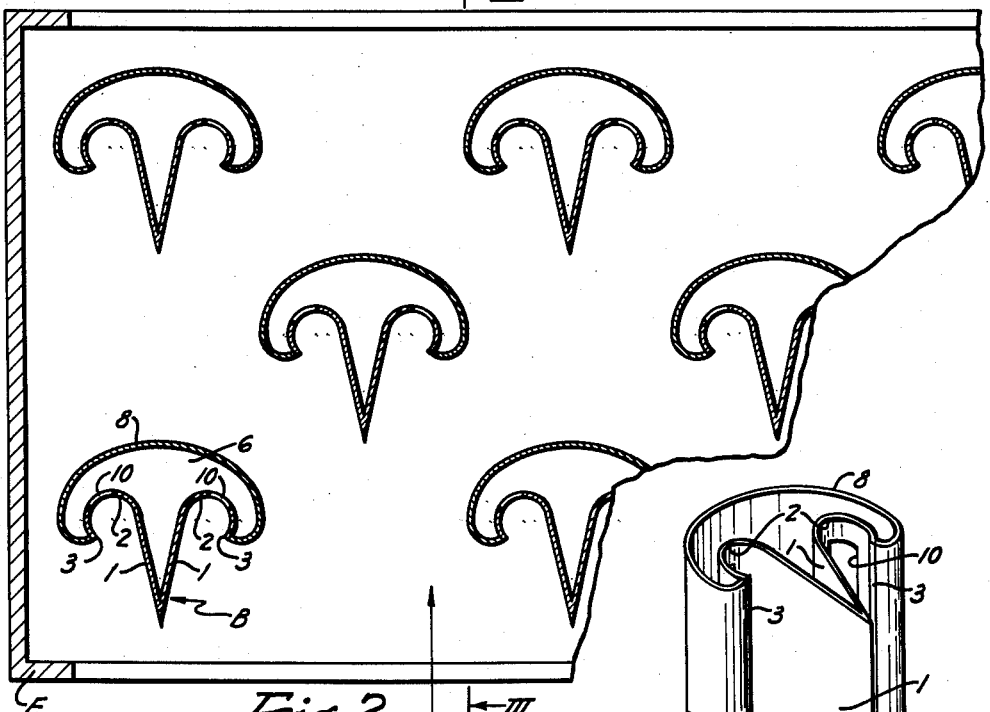
Figure 4:
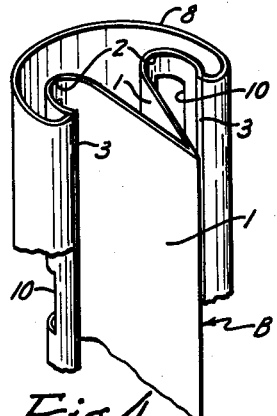
Figure 5:
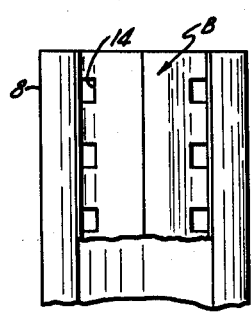
Figure 6:
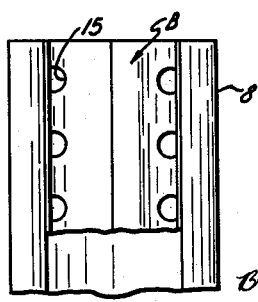

The preferred embodiment of the invention is illustrated in the accompanying drawings, in which Fig. 1 is a front or upstream view of my filter;
Fig. 2 is an enlarged fragmentary horizontal section taken on the line II—II of Fig. 1;
Fig. 3 is a vertical section;
Fig. 4 is a perspective view of a detail; and
Figs. 5 and 6 are fragmentary front views of two different modifications.

Referring to Figs. 1 to 3 of the drawings, the filter has a rectangular frame F, which generally is used in an upright position and therefore will be described that way. Extending from top to bottom of the frame is a large number of filter bars B that are arranged in several parallel rows, three rows being shown by way of example only. The bars in the central row are staggered relative to the row behind and ahead. The bars in each row should not be so close together as to restrict air flow between them and create a back pressure.

Each bar has a central deflector portion extending lengthwise of the bar and tapered in transverse section forward or upstream relative to the stream of gas flowing through the filter. As shown in Fig. 2, the opposite surfaces 1 of the deflector should diverge rearwardly enough to deflect the gas stream to the side, but not enough to change the direction of the stream abruptly. Preferably, the two sides of the deflector are disposed at an angle of about 15° to each other. At opposite sides of the back or downstream end of the deflector, the bar has dust collecting portions that extend away from each other and then upstream and in toward the deflector. The inner surfaces 2 of these portions are curved transversely, and preferably each forms an arc of a circle tangent to the adjoining deflector surface. Consequently gas flowing back along the diverging sides of a deflector will pass around the curved surfaces at its rear end and then out of the dust collecting portions and around their vertical longitudinal edges 3 and back between the bars. As the gas flows around the inside of the collecting portions, dust is thrown out aginst the curved surfaces 2 by centrifugal or cyclone action. Some of the dust may adhere to those surfaces, but much of it will fall to their lower ends.

In order to collect as much dust as possible, the free edges 3 of the dust collecting portions of the bar should be curved back toward the deflector to some extent. However, they must not curve around so far as to direct the emerging gas back against the deflector, for that would cause turbulence with the incoming gas and reduce the efficiency of the filter, including increasing its pressure drop. It has been found that for best results the space between the outer end of each collector portion and the deflector should be more than the radius of the curved surface. The curved surface 2 may extend from about 195° to about 225° from the point where it leaves the deflector, but 210° is preferred.

The bottom of the frame is hollow to form a settling and filtering chamber 5, as shown in Fig. 3. The top of the chamber is provided with openings 6 (Fig. 2) directly behind the bars B. Preferably, the major portion of the front wall of each opening is the same shape as a bar, so that the lower ends of the bars can be inserted in the openings to hold them in place and in shape. The upper part of the frame may be provided with similar openings in the bottom of a chamber 7 for the same purpose. The openings extend behind the bars, and in order to direct some of the gas stream through them, a baffle strip 8 is located behind each bar. These strips extend from top to bottom of the frame and may have their ends mounted in the back parts of the openings, which are shaped accordingly. Each baffle strip is spaced a short distance from the bar ahead of it and is curved transversely as shown, the side portions of the strip curving forward beside the bar and having their side edges meeting edges 3 of the bar. The shape of the baffle strips provides maximum cross section within a limited area for the spaces behind the bars, without causing excessive pressure loss to airflow.

It will be seen that if some of the gas striking the filter bars B is allowed to pass through them, it will strike the baffle strips 8 behind and be deflected vertically into the upper and lower chambers 7 and 5 if they have outlet holes 9 (Fig. 3) in their rear walls to allow flow through them. To permit some of the gas to reach the baffle strips in this way, the curved portions of the bars are provided with passages 10 that may be circular holes, or vertical, horizontal or inclined slots. Although some surface area of the bars is lost because of these passages, the gas that flows through them has the much larger surface area of the baffle strip behind to flow across. Passages 10 are located out of the direct path of the gas stream by forming them in the outer half of curved surfaces 2. The passages are located where maximum dust removal will occur.

The dust entering the large area between each bar and adjacent baffle will slow down and much of it will descend into the lower chamber 5. Some will be carried by the gas up into the upper chamber. Due to the sudden reduction invelocity of the gas as it enters the upper and lower chambers from the ends of the baffle strips, dust will settle in the chambers. However, to catch any dust that might otherwise pass through the chambers with the gas, it is advisable to place filtering material in the chambers. This can be any suitable porous material or it may be a filter sheet 11 covering the chamber outlets 9. Flow of gas into the chambers is promoted by providing their front walls with inlet openings 12 having bell mouth inlets. Some of the gas will then flow straight through the chambers and, in passing across the openings in their horizontal walls, will produce an aspirating effect that will help draw gas into the chambers. The dust that escapes from the vertical edges of the bars in the first row will strike the bars and strips farther back in the filter, so most of it will end up in the colecting chambers. These chambers may be cleaned out periodically by removing a removable side wall of either chamber. The filter bars shown in Figs. 5 and 6 illustrated horizontal passages 14 and circular passages 15, respectively.

According to the provision of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A gas filter for use in a stream of gas that contains dust or other particulate matter, comprising an upright frame provided in its bottom with a chamber having outlets in its back, a plurality of vertical bars arranged in parallel rows in the frame with the bars in each row staggered relative to those in the row behind it, each of said bars having a central deflector portion extending lengthwise thereof and tapered upstream in transverse section, each bar at opposite sides of the downstream end of its deflector portion having dust collecting portions extending outward and then upstream to form transversely curved inner surfaces, the top of said chamber being provided with an opening directly behind each bar, and transversely curved vertical baffle strips having their lower ends disposed at the back of said openings, each baffle strip being spaced from the bar in front of it and having its side portions curved forward and substantially meeting the edges of that bar, and said dust collecting portions of the bars being provided in the outer half of said curved surfaces with passages for some of the gas flowing through the filter so that dust therein can strike said baffle strips and pass down through said openings into said chamber.

2. A gas filter according to claim 1, in which each of said curved inner surfaces of the bars forms an arc of a circle tangent to the adjoining deflector surface.

3. A gas filter according to claim 1, in which each of said curved inner surfaces of the bars forms an arc of a circle tangent to the adjoining deflector surface, and the space between the outer end of the arc and the deflector is more than the radius of said circle but less than its diameter.

4. A gas filter for use in a stream of gas that contains dust or other particulate matter, comprising an upright rectangular frame provided in its bottom with a chamber having outlets in its back and aspirating inlets in its front, filtering material in said chamber, the top of the chamber being provided with parallel rows of openings with the openings in each row staggered relative to those in the row behind it, a plurality of vertical bars having their lower ends disposed in the front part of said openings to hold the bars upright and in laterally spaced and staggered relation, each of said bars having a central deflector portion extending lengthwise thereof and tapered upstream in transverse section, each bar at opposite sides of the downstream end of its deflector having dust collecting portions extending outward and then upstream to form transversely curved inner surfaces, said dust collecting portions being provided in the outer half of said curved surfaces with gas passages therethrough, and transversely curved vertical baffle strips having their lower ends disposed in the back part of said openings, each baffle strip being spaced from the bar in front of it and having its side portions curved forward beside that bar and meeting its edges, whereby some of the gas flowing back along the sides of said deflector portions will pass around said curved surfaces and some of said gas will pass through said passages and down between the bars and the strips directly behind them and into said chamber.

References Cited in the file of this patent

UNITED STATES PATENTS

| 1,603,878 | Smith | Oct. 19, 1926 |

FOREIGN PATENTS

| 8244/27 | Australia | July 12, 1927 |
| 475,436 | Germany | Nov. 3, 1930 |
| 42,510 | France | May 8, 1933 |
| | (1st addition to No. 740,700) | |
| 1,056,258 | France | Oct. 21, 1953 |
| 699,760 | Great Britain | Nov. 18, 1953 |
| 712,542 | Great Britain | July 28, 1954 |